United States Patent [19]
Otto

[11] Patent Number: 5,139,050
[45] Date of Patent: Aug. 18, 1992

[54] MULTI-FUNCTIONAL VALVE

[76] Inventor: Frank J. Otto, 789 Portsmouth Dr., Island Lake, Ill. 60042

[21] Appl. No.: 789,281

[22] Filed: Nov. 8, 1991

Related U.S. Application Data

[63] Continuation-in-part of Ser. No. 727,456, Jul. 9, 1991.

[51] Int. Cl.⁵ ............................................ F16K 11/085
[52] U.S. Cl. ........................... 137/625.29; 137/625.47; 210/418; 210/424
[58] Field of Search ...................... 137/625.29, 625.47; 210/418, 424

[56] References Cited

U.S. PATENT DOCUMENTS 3,198,015  8/1965  Smith ............................ 137/625.47
4,933,080  6/1990  Rundzaitis et al. ................. 210/424

*Primary Examiner*—Arnold Rosenthal
*Attorney, Agent, or Firm*—Mathew R. P. Perrone, Jr.

[57] ABSTRACT

A multi-functional valve includes a body and a circular piston. The piston has at least one circular O-ring surrounding the piston body. There is also a side mounted O-ring with a central axis substantially perpendicular to the circular O-ring.

20 Claims, 5 Drawing Sheets

FIG. 3
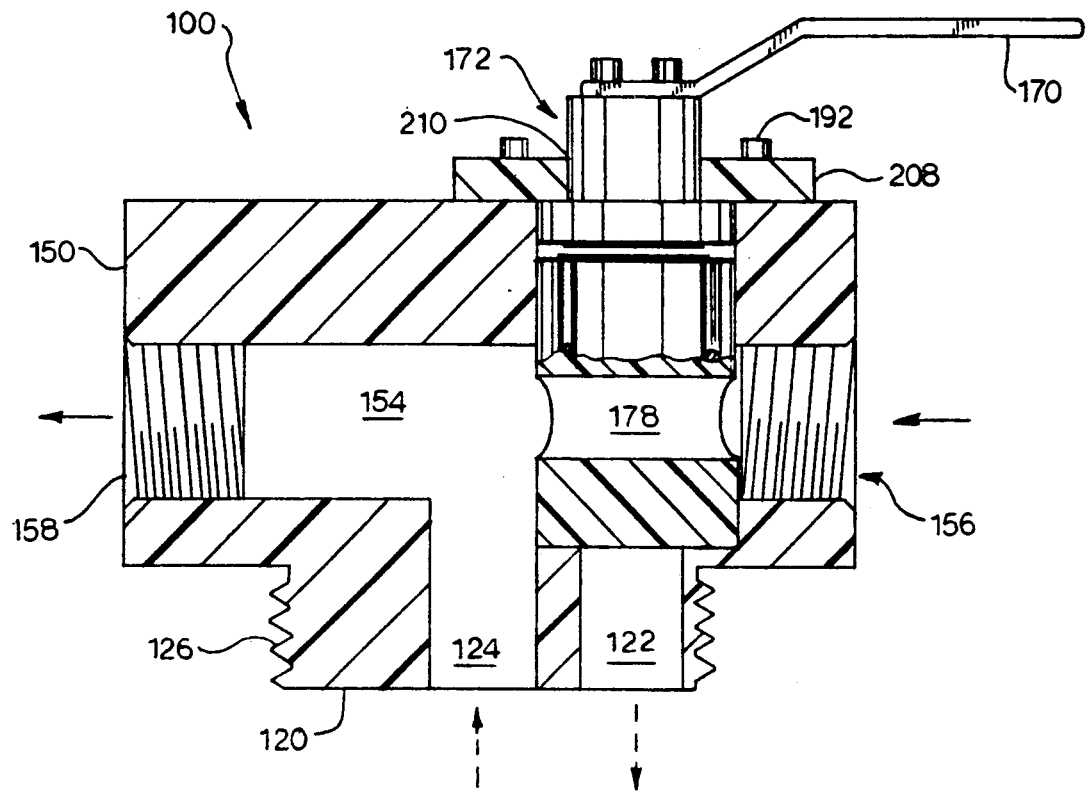
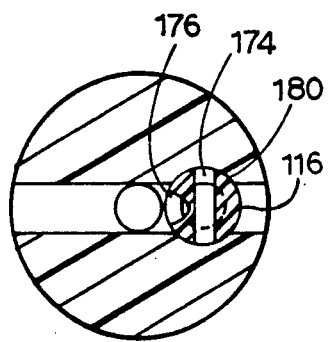
FIG. 6
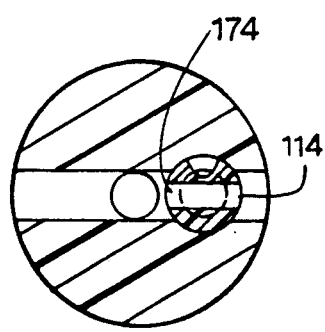
FIG. 5
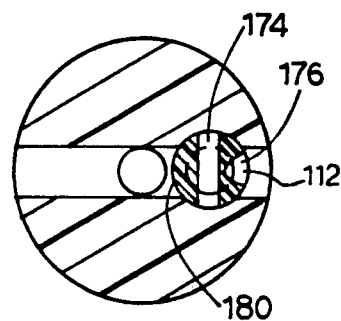
FIG. 4

MULTI-FUNCTIONAL VALVE

CROSS-REFERENCE TO RELATED APPLICATION

This application is a continuation in part of the U.S. application Ser. No. 07/727,456 filed Jul. 9, 1991, by the same inventive entity.

BACKGROUND OF THE INVENTION

It is well-settled that water is critical to life on this planet. Providing a suitable source of water is critical to both personal health and industrial health. Potable water is essential to life. Potable water with a pleasing taste adds to the quality of life.

Due to concerns of health, taste, and other functions, many people now treat their water or have special bottled water brought into the home for cooking or drinking. When installing an exchange system for home water system, it is not always desired to use the water that has been passed through the exchange system. It is sometimes desired to use the untreated water. Typical examples of uses for the untreated water include, but are not limited to, watering the lawn or washing the car.

The filtering system exchange tank is installed in the main waterline of a home or a business. In this particular matter, reference to a home can include any suitable structure, whether it is a residence or business. Water is critical for any structure used by a human.

The main waterline is the one that comes into the house. This filtering system exchange tank system filters all the water coming into the home. In the event of a tank leakage, it is necessary to shut off water to the home. This loss of water is undesired.

Yet the installation of the exchange system for a home water system sometimes causes great difficulty in achieving this matter. It is always possible to install a very complicated combination of a separate bypass valve and a separate shut-off valve, which greatly complicates the installation of the exchange system. With the installation of the exchange system, proper application of a multi-functional valve having a combined safety, bypass, shut-off and inservice capability can greatly simplify the matter of installation, as well as greatly reduce the cost thereof from both a labor and material standpoint.

Thus, one must give weight to the complications of the combined bypass, shut-off valve for an exchange system to avoid the application of filtered or treated water, as opposed to the desired consumption of treated water. The complicated combined bypass valving system may even cause some people to avoid use of such treated water, when it is highly desired to have such treated water.

In the U.S., it is common to treat public water supplies with various chemicals. These chemicals are needed to disinfect the water. This treatment is necessary to avoid adverse health effects. However, it is also possible for the treatment to result in a composition which can have an adverse reaction, especially to health and the environment.

For example, chlorine which is commonly used in disinfecting water can have an undesired effect on the taste or odor of the water. It is highly desired to have a filter system with a multi-functional valve operably secured thereto, which can permit the filtration of the chlorine from the water while at the same time permit the unfiltered water to be used for watering lawns or similar noncritical functions.

If the installation of a water treatment system is simplified, tremendous advantages can occur. Not only does a person receive better water for consumption, it can be more simple for that person to avoid using treated water for non-critical purposes.

SUMMARY OF THE INVENTION

Therefore, it is an objective of this invention to provide a multi-functional valve having a combined bypass, shut-off and inservice capability to be applied to a water treatment system.

A further objective of this invention is to provide a multi-functional valve to minimize concern about water with regard to health.

A still further objective of this invention is to provide a multi-functional valve to minimize concern about water with regard to consumption.

Yet a further objective of this invention is to provide a multi-functional valve to minimize concern about water with regard to taste.

Also an objective of this invention is to provide a multi-functional valve to use treated water when desired.

Another objective of this invention is to provide a multi-functional valve to use untreated water when desired.

Yet another objective of this invention is to provide a simplified, multi-functional valve, which is easily installed.

Still another objective of this invention is to provide a multi-functional valve, which simplifies installation of a water treatment system.

A further objective of this invention is to provide a multi-functional valve with minimized valve leakage concern about water with regard to consumption.

A still further objective of this invention is to provide a multi-functional valve to assist the operation of a system for removing water treatment chemicals.

Yet a further objective of this invention is to provide a multi-functional valve to avoid skin reaction.

Also an objective of this invention is to provide a multi-functional valve to bypass a leaking treatment tank.

Another objective of this invention to provide a multi-functional valve having a combined safety, bypass, shut-off and inservice capability for a water treatment system to select when to use treated or untreated water.

Yet another objective of this invention is to provide a method for bypassing a water treatment system.

Still another objective of this invention is to provide a method for isolating a leaking water treatment system from the main water line.

These and other objectives of the invention (which other objectives become clear by consideration of the specification, claims and drawings as a whole) are met by providing a multi-functional valve having a combined bypass shut-off and inservice capability, the multi-functional valve being modified to attach directly to the cylinder of an exchange unit. This multi-functional valve has a base member and a head portion. The base member fits onto the exchange cylinder. The head portion of the multi-functional valve includes a water receiving section capable of being tapped directly into the waterline. Mounted to the head section is a lever arm to move the valve to the desired position.

BRIEF DESCRIPTION OF THE DRAWINGS

FIG. 3 depicts a side, cross-sectional view of the multi-functional valve 100.

FIG. 4 depicts a top, cross-sectional view of the multi-functional valve 100, in filtered position 112.

FIG. 5 depicts a top, cross-sectional view of the multi-functional valve 100, in unfiltered position 114.

FIG. 6 depicts a top, cross-sectional view of the multi-functional valve 100, in closed position 116.

Throughout the figures of the drawing where the same part appears in more than one figure, the same numeral is applied thereto.

DESCRIPTION OF THE PREFERRED EMBODIMENTS

Figure 1:
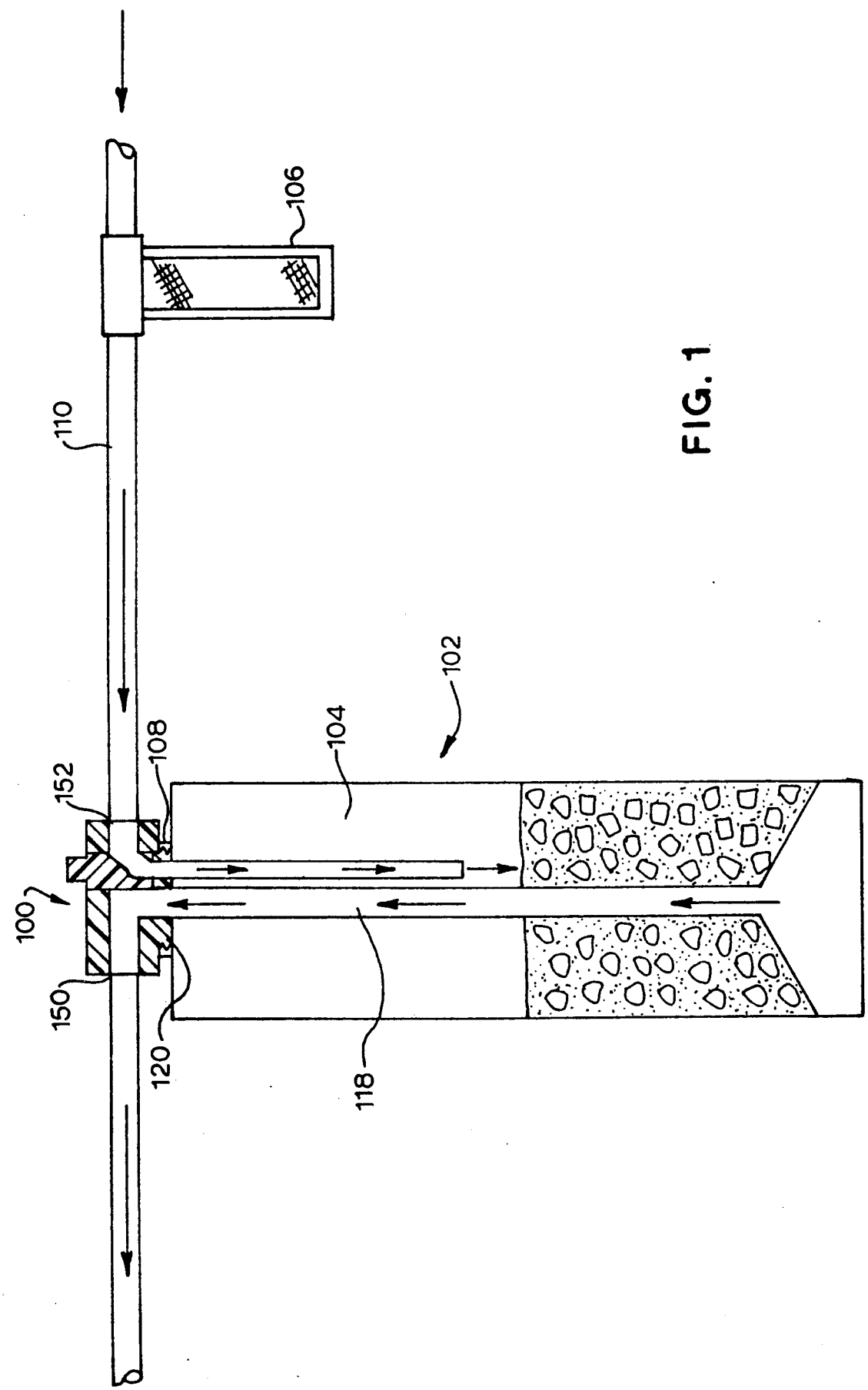
FIG. 1 depicts a perspective view of the multi-functional valve 100 of this invention installed on a water treatment system 102.

A multi-functional valve having a combined bypass (or unfiltered), shut-off and in-service (or filtered) capability is modified to attach directly to the cylinder of an exchange unit. This valve is at least a three-in-one or trifunctional valve. For the most part, cylinder heads of exchange units have a common size. Thus, one multi-functional valve can fit most exchange cylinders. It is possible to provide for a modification or adapter to permit the multi-functional valve to fit all cylinders. This particular multi-functional valve is clearly at least trifunctional and has a base member and a head portion.

This particular multi-functional valve has a base member which fits onto the cylinder. The base member includes an inlet and an outlet. The head portion of the multi-functional valve includes a water receiving section capable of being tapped directly into the waterline. This valve receiving section can permit water to pass directly therethrough.

A single lever can position a piston-shaped, actuating member of the multifunctional valve. The actuating member is generally piston shaped. The piston shaped member is actuated by the single lever. With the lever, the piston can be placed in a variety of desired positions.

The piston has a bypass (or unfiltered) position, a shut-off position and an in-service (or filtered) position. In the in-service position, the valve permits water to pass through the exchange unit. Water passes into the cylinder of the exchange unit and is treated by the medium therein. A common medium is activated charcoal, although other mediums may be suitable. The water then leaves the exchange unit going to the base unit and passes out of the valve into the water system of the structure as filtered water.

There is also a bypass (or unfiltered) position for the actuating member. The position permits water to pass through the valve without passing through the cylinder. Clearly bypass (or unfiltered) position provides a number of uses for the water treatment. Firstly, when treated water is not required, this unfiltered position provides a simple method of obtaining the untreated water. Untreated water can typically be used for washing a vehicle or watering a lawn.

Secondly, with the bypass (or unfiltered) position, the exchange unit is avoided when there is a problem therewith. For example, when the exchange unit leaks, it may be bypassed without denying water to the structure.

When desired, the valve of this invention can also be used to simply shut off water to the structure. This valve requires only a one-quarter turn to reach any of its positions, while a standard main shutoff valve for water usually requires many turns to complete the shutoff. The extra time thus required for closing the main shutoff valve can result in more water loss and greater damage. The valve of this invention with its reduced turning factor permits a faster and more efficient shutoff.

The filtering system exchange tank is installed in the main waterline of a structure, such as a home. The main waterline is the one that comes into the house from the main water supply whether, it is a private well or public water supply. This filtering system exchange tank typically filters all the water coming into the home.

The particular valve, which is the subject of this patent application, permits the home owner simply to bypass the filter system. Thus, when the home owner desires to water the lawn, good filtered water is not wasted on the lawn. The valve is thus a tri-functional, three-in-one valve for the filter system and water system as a whole.

This single valve structure eliminates the need for multiple valves and extra plumbing normally required to install the filtration system. The single valve makes the system simpler to install so that the home owner can install it easily. It also provides for a safety device if the exchange tank leaks. In the event of tank leakage, the valve permits an easy bypass of the tank without shutting off water to the home.

The water head includes a main water passage therethrough. The valve lever system activates a piston-shaped valve which in a release position blocks the water flow through the water passage and permits the water to flow through the exchange cylinder. In a closed position, the piston-shaped valve blocks passage of the water into the exchange cylinder and permits complete bypass of the exchange system so that untreated water is used to wash a car, water the lawn or carry out similar functions.

The piston-shaped valve includes an upper cylindrical groove in the outer surface near the handle. There is a base cylindrical groove near the base of the piston. Each groove may receive one or more O-rings, therein.

Perpendicular to the axis of the bypass aperture of the piston, the lower groove, and the upper grove is a circular groove in the sidewall of the piston. The circular groove receives one or more O-rings mounted on the side of the piston, which greatly assists the sealing mechanism of the piston in the device. Accordingly, this circular groove and the side grooves, with the O-rings mounted therein, provide a strong sealing mechanism and improve the efficiency of the piston in sealing. The sidewall circular groove with the O-ring mounted therein greatly facilitates the operation of piston in moving from point to point or position to position. It also improves the efficiency of the piston in operation of the piston and the moving of the piston from one stage to the other.

Referring now to FIG. 1, a multi-functional valve 100 having a combined safety, by-pass, shut-off and inservice capability of this invention is installed on a water treatment system 102. The water treatment system 102 includes a cylinder 104 and a prefilter unit 106. The prefilter unit 106 serves to removes particles or similar items from the water. The cylinder 104 removes undesired chemicals and similar substances from the water.

Clearly, the multi-functional valve 100 is at least tri-functional. The multi-functional valve 100 is modified to attach directly to the cylinder 104 of water treatment system 102. For the most part, a cylinder head 108 of cylinder 104 has a common size with female threads therein to receiver valve 100.

Centrally located on the cylindrical axis of cylinder 104 is an inlet tubular member 113, which extends a predetermined distance into the cylinder 104 and carries water thereinto, and an outlet tubular member 118 extending toward a bottom of cylinder 104, capable of having water pass therethrough and out of cylinder 104 after treatment. Thus, one multi-functional valve 100 can fit most types of cylinder 104. It is possible to provide for a modification or adapter to permit the multi-functional valve 100 to fit all types of cylinder 104. An especially suitable multi-functional valve 100 has a base member 120 and a head portion 150.

Figure 2:
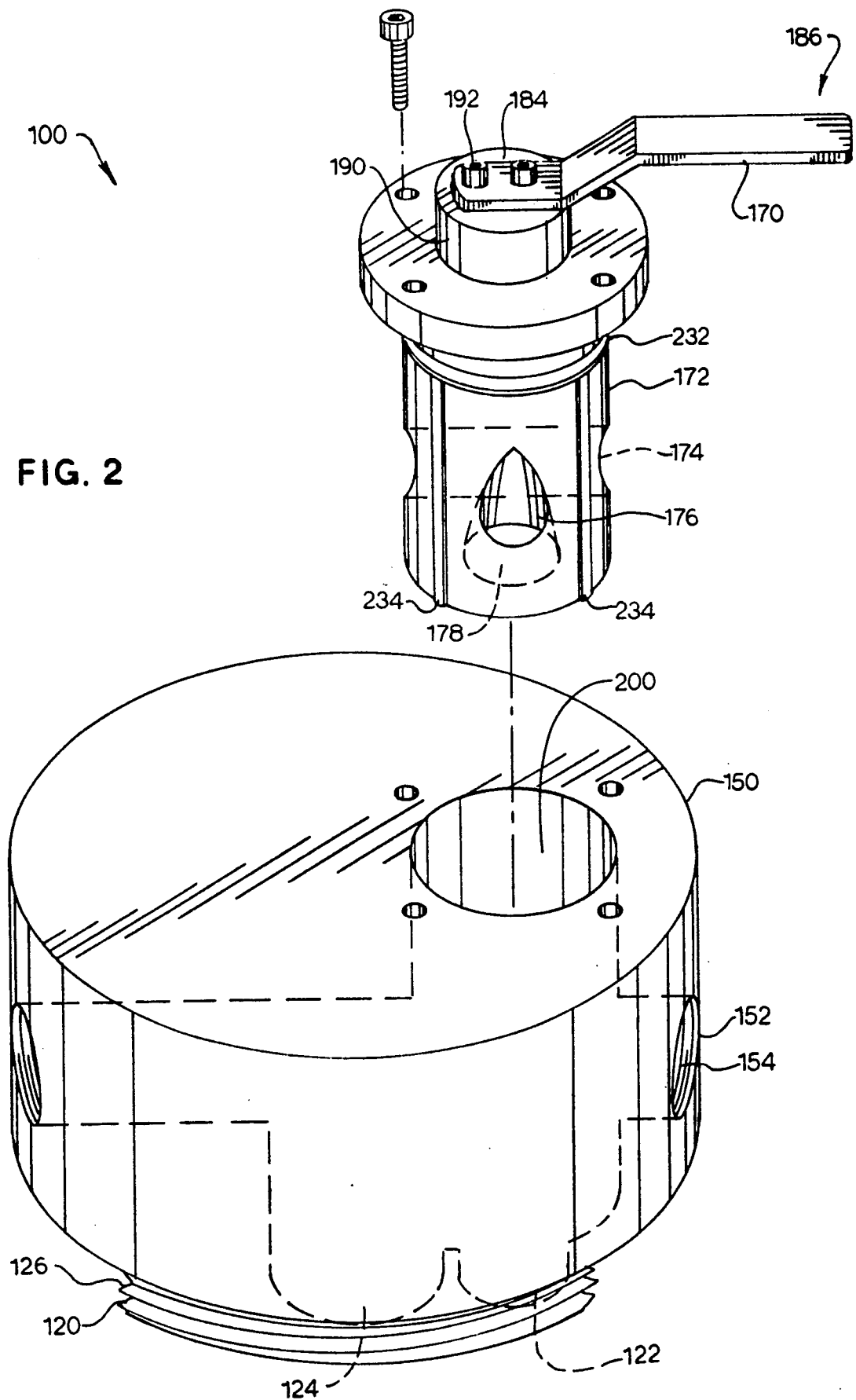
FIG. 2 depicts a perspective view of the multi-functional valve 100.

Referring now to FIG. 1, FIG. 2, and FIG. 3, valve 100 is generally cylindrical in nature. Base member 120 of multi-functional valve 100 fits onto the cylinder 104. The base member 120 includes a base inlet 122 and a base outlet 124. The head portion 150 of the multi-functional valve 100 includes a water receiving section 152 capable of being tapped directly into waterline 110. This water receiving section 152 permits water to pass directly therethrough by means of headtube 154.

Base outlet 124 is substantially centrally located on the central axis of base member 120 and head portion 150. Clearly head portion 150 and base portion 120 share a common central axis. Base member 120 is of sufficient diameter so that male threads 126 thereof can threadably mesh with the female threads of cylinder head 108. Base inlet 122 communicates with and is coaxial with tubular member 113 extending into the interior of cylinder 104. Base outlet 124 then communicates with and is coaxial with tubular member 118 to receive the filtered water.

The particular multi-functional valve 100, which is the subject of this patent application, permits the home owner or other water user to by-pass the filter system. When the water user desires to water the lawn, filtered water is not wasted on the lawn. The valve 100 may also be used to shut off the water to house or cylinder 104. The valve 100 is thus both a by-pass valve and a shut-off valve for the water treatment system 102 and for the water system as a whole.

The head portion 150 of the valve 100 includes a main water passage therethrough in the form of headtube 154. Lever 170 is mounted on the top of head portion 150. The lever 170 is secured to a piston 172 for activation purposes. Various positions of lever 170 and piston 172 change the communication of headtube 154, base inlet 122 and base outlet 124.

Piston 172 in a filter position 112 (FIG. 4) blocks the water flow through the headtube 154 and permits the water to flow through the cylinder 104. In an unfiltered position 114 (FIG. 5), the piston 172 blocks passage of the water into the cylinder 104 and permits complete by-pass of the cylinder 104 through piston aperture 178, so that untreated water is used to wash a car, water the lawn or similar functions.

Water passing through headtube 154 is achieved by inserting headtube 154 into the main waterline 110 of the house (not shown). First headtube end 156 receives the incoming water by being soldered, threaded or otherwise secured to main waterline 110. Second headtube end 158 is secured to the main waterline 110, thereby again completing a water flow to the house.

Base unit inlet 122 communicates with first headtube end 156 and receives the incoming water therefrom. Base unit inlet 122 permits water to pass into cylinder 104. Water comes out of cylinder 104 through base unit outlet 124. Base unit outlet 124 communicates with second headtube end 158.

Valve 100 is operated by a lever 170. Lever 170 is operably connected to piston 172 and, in FIG. 4, is depicted to have a filtered or in-service position 112. With in-service position 112, valve actuator in the form of piston 172 forces water through cylinder 104. Piston 172 has an angled aperture 176 to direct water from first headtube end 156 into base unit inlet 122, and thence into cylinder 104. Water pressure forces water out of cylinder 104 through tubular member 118 into base unit outlet 124 and second headtube end 158.

In-service position 112 causes piston 172 to close headtube 154 and force water through base unit inlet 122. Water then passes into cylinder 104. Thus, it becomes clear that lever 170 is secured at a first end portion 184 to piston 172 at head portion 150 in a partially rotatable fashion. Second end portion 186 of lever 170 moves to permit lever 170 to actuate closed position 116, unfiltered position 114 or in-service position 112.

FIG. 5 depicts valve 100, in unfiltered position 114, which permits water to pass directly through valve 100 and piston 172 without passing through cylinder 104. Lever 170 can close the valve 100 in unfiltered or bypass position 114 and require water go directly through headtube 154 without filtration. In unfiltered position 114, piston 172 has bypass aperture 174 coaxial with headtube 154. This position requires that water pass directly through headtube 154 and not into cylinder 104.

FIG. 6 depicts the multi-functional valve 100, in closed position 116, which uses piston 172 to prohibit any water passage through the valve 100. Opposing side 180 of piston 172 serves to block headtube 154 and first headtube end 156. Opposing side 180 adjacent to first headtube end 156 forms closed position 116 and cuts off the flow of water in main waterline 110 and thence the structure (not shown).

Figure 7:
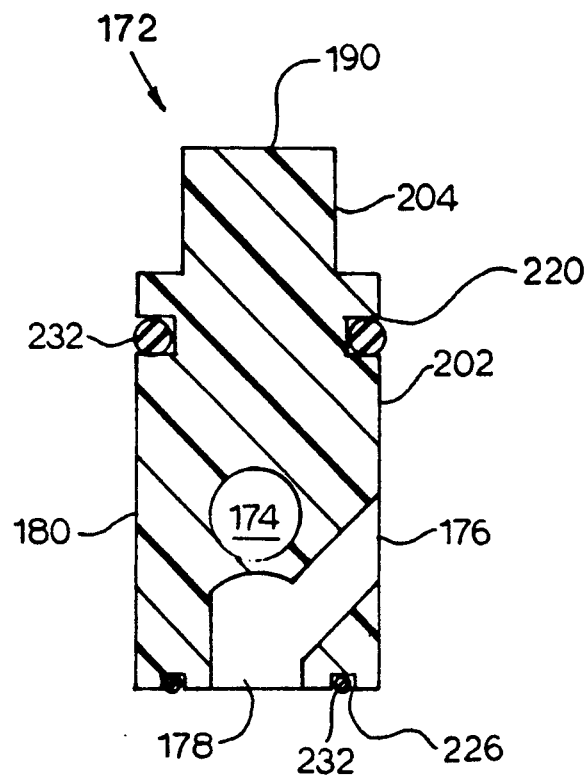
FIG. 7 depicts a side, cross-sectional view of the piston 172.
Figure 8:
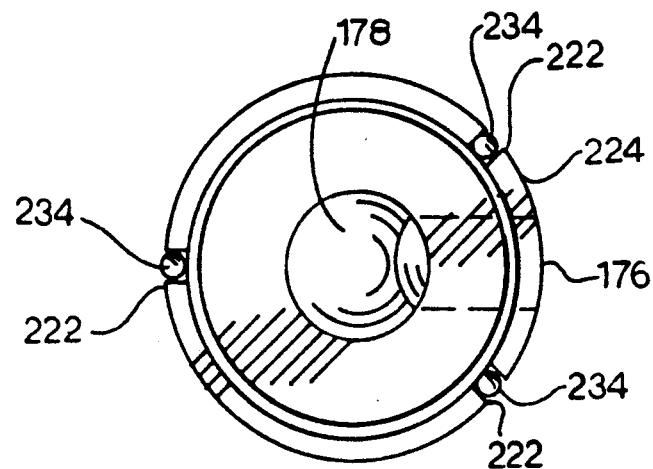
FIG. 8 depicts a bottom, plan view of the piston 172.

Piston 172 is shown in FIG. 1, FIG. 7 and FIG. 8 to be of a generally cylindrical shape. A concave central portion 178 is in a base of piston 172. Piston 172 also has a handle top 190 oppositely disposed from the concave central portion 178. Handle top 190 has first end portion 184 of lever 170 secured thereto by a pair of allen head bolts 192 or other suitable fashion.

Opposing side 180 is a basically an unmodified, solid surface side of piston 172. Angled aperture 176 is formed in the side of piston 172, and is oppositely disposed from both opposing side 180 and handle top 190. Angled aperture 176 serves to divert and force water through cylinder 104. Concave central portion 178 communicates with angled aperture 176. Angled aperture 176 communicates with first headtube end 156 when piston 72 is in filtered position 112.

Bypass aperture 174 goes completely through piston 172 and aligns with headtube 154, when piston 172 is in unfiltered position 114. The axis of bypass aperture 174 is perpendicular to angled aperture 176. Bypass aperture 174 and angled aperture 176 do not communicate.

Piston 172 is substantially vertically fixed in head portion 150, but horizontally rotated around a vertical axis. Lever 170 moves piston 172 from in-service position 112, to unfiltered position 114 to closed position 116 as desired by moving lever 170 only one-quarter of a turn. Such efficient action minimizes the problem with water loss and other problems.

Piston 172 can include various sealing members. Piston 172 is received in head portion 150 at piston aperture 200. Piston aperture 200 passes through head portion 150 at a distance from the central axis of head portion 150 and terminates at base portion 120. Piston 172 has interior portion 202, which fits into and substantially fills piston aperture 200, and a stepped portion 204, which protrudes from head portion 150.

Stepped portion 204 is of a lesser diameter than interior portion. Lever 170 is secured to the top of stepped portion 204. Flattened ring 208 fits around stepped portion 204 at its ring aperture 210. Ring aperture 210 is too small for interior portion 202 to fit therethrough. When flattened ring 208 is secured to head portion 150, piston 172 is locked onto head portion 150 and valve 100. A typical securing manner for flattened ring 208 is by allen head bolts 192 or other suitable fashion. Lever 170 may similarly fashioned.

A sealing mechanism for piston 172 can insure against a leak. A desired sealing mechanism includes a peripheral, cylindrical groove 220 on interior portion 202 between bypass aperture 174 and stepped portion 204. Cylindrical groove 220 is also between stepped portion 204 and angled aperture 176. Proceeding downwardly from cylindrical groove 220 are the preferred three longitudinal grooves 222 (FIG. 8). Longitudinal grooves 222 extend from cylindrical groove 220 to base 224 of piston 172. Base 224 includes concave central portion 178. Concave groove 226 is cut into a bottom surface 227 of base 224 and surrounds concave central portion 178. Other sealing assemblies are operable, but this sealing assembly is preferred.

Concave groove 226, longitudinal grooves 222 and cylindrical groove 220 may differ in number as desired and may all receive solid flexible pieces of waterproof material to provide for sealing of valve 100. This structure avoids leaking. One or more 0-rings 232 fit in concave groove 226 and cylindrical groove 220 for sealing. A long rod 234 fits into each of longitudinal groove 222. The flexible pieces of waterproof material are compressed, glued or otherwise secured therein appropriately.

Figure 9:
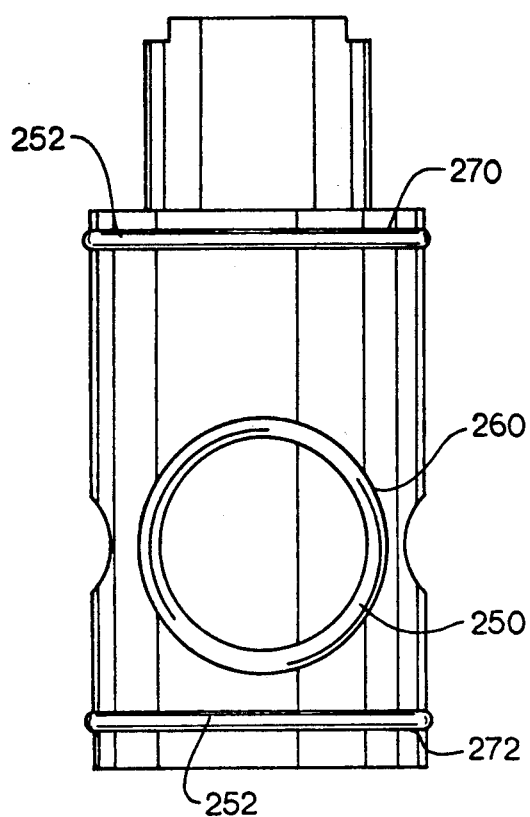
FIG. 9 depicts a side, cross-sectional view of the multi-functional valve 100 with side O-ring 250 mounted on piston 172.
Figure 10:
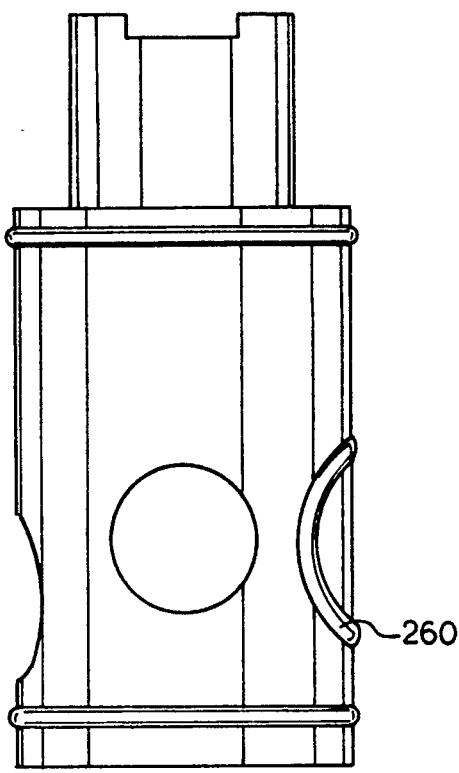
FIG. 10 depicts a front view of O-ring 250 mounted on piston 172.
Figure 11:
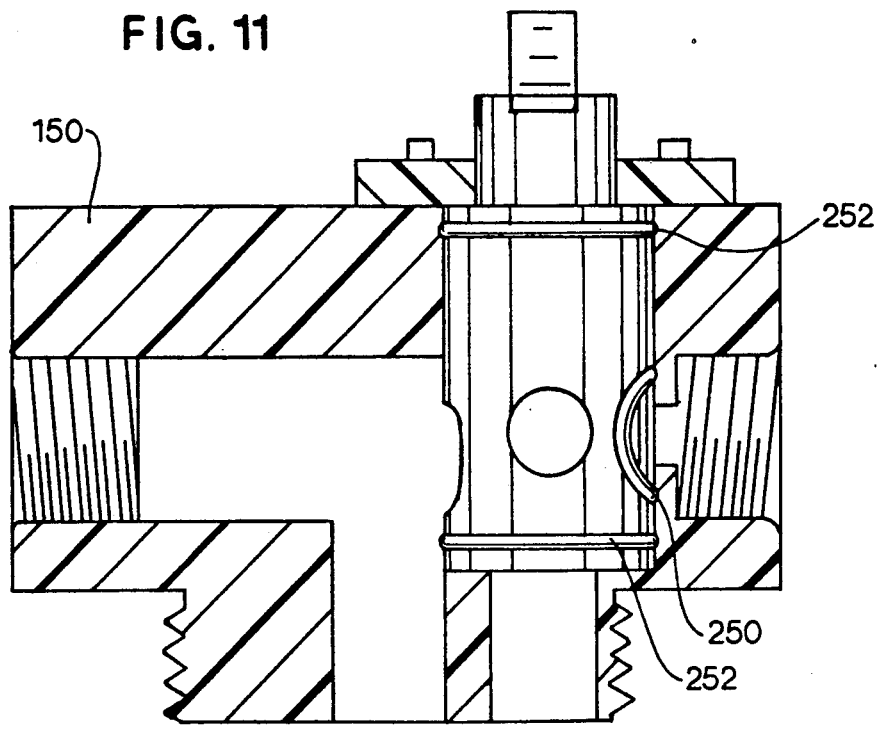
FIG. 11 depicts a side view of O-ring 250 mounted on piston 172.

FIG. 9, FIG. 10 and FIG. 11 depict side mounted 0-ring 250 mounted on piston 172 as a preferred form of sealing for valve 100. Side mounted 0-ring 250 combines with upper cylindrical groove 270 and base cylindrical groove 272 to provide for ease of rotating piston 172, while maintaining the desired tight seal. This upper cylindrical groove 270 and base cylindrical groove 272 may receive one or more circular 0-rings 252. There can be a plurality of upper cylindrical groove 270 and a second cylindrical groove 272 on the base thereof.

Perpendicular to the axis of the bypass aperture 174 between the lower groove 272 and the upper grove 270 is a circular groove 260 to receive side-mounted 0-ring 250 with in the surface of the sidewall of piston 172. The circular groove 260 receives side-mounted 0-ring 250 which greatly assists the sealing mechanism of the piston 172 in the device. Thus each circular 0-rings 252 has the same axis, while the axis for side mounted 0-ring 250 is substantially perpendicular thereto in a preferred structure.

Accordingly, this circular groove 260 and grooves 270 and 272 provide a strong sealing mechanism and improve the efficiency of the piston 172 in sealing. The circular groove 260 with side mounted 0-ring 250 mounted therein also improves the efficiency of the piston 172 in operation of the piston 172 and the moving of the piston 172 from one position to the other of multi-functional valve 100.

This application —— taken as a whole with the specification, claims, abstract, and drawings —— provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this apparatus can become clear to a person having ordinary skill in this particular art. Such modifications are clearly covered by this disclosure.

What is claimed and sought to be protected by Letters Patent of the U.S. is:

1. A multi-functional valve including a housing and piston member, and having a combined bypass, shut-off and inservice capability to be applied to a water treatment system, wherein:
   a. said housing has a base member and a head portion;
   b. said base member includes a securing means for securing said valve to a cylinder;
   c. said cylinder forms a part of said water treatment system;
   d. said piston member includes a sealing mechanism capable of operably cooperating with said housing;
   e. said piston member has a shut-off position, a filtered position and an unfiltered position;
   f. said piston member is movable mounted within said housing;
   g. a lever is operably connected to said piston member;
   h. said lever is situated exterior in relation to said housing;
   i. said piston includes a wall;
   j. said sealing mechanism includes at least one member encircling said piston member and at least one member mounted in a groove in said wall; and
   k. said at least one member encircling said piston member has an encircling axis perpendicular to an axis of said groove in said wall.

2. The multi-functional valve of claim 1 wherein said at least one member mounted in a groove in said wall is circular in nature.

3. The multi-functional valve of claim 2 wherein:
   a. said piston member changes from said filtered position, to said bypass position, and to said closed position by a one-quarter turn between a pair of adjoining positions;
   b. said head portion includes a headtube passing through said headportion;

c. said water treatment system includes said cylinder and a prefilter unit;
d. said cylinder includes a cylinder head; and
e. said cylinder head has female threads therein to receive said valve.

4. The multi-functional valve of claim 2 wherein:
a. said cylinder receives said base member;
b. said base member includes a base inlet and a base outlet;
c. said base member and said head portion share a common central axis; and
d. said base outlet is substantially centrally located on said central axis of said base member and said head portion.

5. The multi-functional valve of claim 2 wherein:
a. said cylinder includes a cylinder head;
b. said cylinder head includes female threads therein to receive said valve; and
c. said base member includes male threads capable of threadably meshing with said female threads.

6. The multi-functional valve of claim 2 wherein:
a. said water receiving section includes a headtube tappable directly into a waterline;
b. said head portion includes a piston aperture to receive said piston member;
c. said piston aperture substantially terminates at said base member; and
d. an operating means is secured to said piston member.

7. The multi-functional valve of claim 6 wherein:
a. said headtube, said base base inlet and said base outlet may communicate;
b. said piston member changes communication of said headtube, said base base inlet and said base outlet by moving through said filtered position, said bypass position, and said closed position;
c. said filtered position blocks water flow through said headtube and permits water to flow through said cylinder;
d. said unfiltered position blocks passage of water into said cylinder and permits complete by-pass of said cylinder; and
e. said closed position cuts off water flow.

8. The multi-functional valve of claim 7 wherein:
a. said headtube includes a first headtube end to receive said incoming water by being secured to a first cut end of a main water line;
b. said headtube includes a second headtube end to receive a second cut end of a main water line; and
c. said headtube end and said headtube end serve to connect said valve to said main waterline and close said main waterline.

9. The multi-functional valve of claim 8 wherein:
a. said cylinder includes an axial outlet tube; and
b. said axial outlet tube is coaxial with said base unit.

10. The multi-functional valve of claim 9 wherein:
a. said piston member includes an angled aperture to direct water from said first headtube end into said base unit inlet and thence into said cylinder; and
b. said angled aperture communicates with said first headtube end and said base unit inlet with said piston member in said filtered position.

11. The multi-functional valve of claim 9 wherein:
a. said piston member includes a bypass aperture to direct water from said first headtube end to said second headtube end; and
b. said bypass aperture communicates with said first headtube end and said second headtube end with said piston member in said bypass position.

12. The multi-functional valve of claim 9 wherein:
a. said closed position has an axis of bypass aperture perpendicular to an axis of said first headtube end; and
b. said closed position has said angled aperture oppositely disposed from said first headtube end.

13. The multi-functional valve of claim 9 wherein:
a. said piston member is of a generally cylindrical shape;
b. said piston member has a base fitting into said piston aperture;
c. said base includes a concave central portion;
d. said piston member includes a handle top oppositely disposed from said concave central portion;
e. said handle top includes a first end portion of a lever; and
f. said lever is operably secured to said piston member.

14. The multi-functional valve of claim 13 wherein:
a. said piston member is sealably rotatable about its central axis in said valve body;
b. said concave central portion communicates with said angled aperture; and
c. said bypass aperture is removably alignable with said headtube.

15. The multi-functional valve of claim 14 wherein:
a. said head portion includes a piston aperture;
b. said piston aperture terminates at said base portion;
c. said piston member includes an interior portion and a stepped portion;
d. said interior portion fits into and substantially fills piston aperture;
e. said stepped portion protrudes from said headportion;
f. said interior portion and said stepped portion are cylindrical in shape; and
g. said interior portion has a larger diameter than said stepped portion.

16. The multi-functional valve of claim 15 wherein:
a. a first circular member of said at least one circular sealing member is secured to said edge of said interior portion and perpendicular to an axis of said interior portion;
b. said first circular member is secured between said stepped portion and said bypass aperture; and
c. a second circular member is secured in said base of said interior portion and concentric with said concave portion.

17. The multi-functional valve of claim 16 wherein:
a. said lever is secured to a top of stepped portion;
b. a flattened ring fits around step portion; and
c. said flattened ring is secured to said head portion thereby vertically securing said interior portion in said piston aperture.

18. A multi-functional valve having a combined safety, bypass, shut-off and inservice capability to be applied to a water treatment system, wherein:
a. said multi-functional valve includes a housing having a base member and a head portion;
b. said base member includes a securing means for securing said valve to a cylinder;
c. said cylinder forms a part of said water treatment system;
d. a piston member is operably cooperating with said housing;

e. said piston member has a shut-off position, a filtered position and an unfiltered position;
f. said piston member includes an interior portion and a stepped portion;
g. said interior portion fits in top and substantially fills piston aperture;
h. said base member includes an inlet and an outlet;
i. said head portion includes a water receiving section capable of being tapped directly into a waterline;
j. said piston member has a filtered position, a bypass position, and a closed position;
k. said piston member includes a sealing mechanism;
l. said piston member includes a wall;
m. said sealing mechanism includes at least one member encircling said piston member and at least one member mounted in a groove in said wall;
n. said at least one member mounted in a groove in said wall is circular in nature;
o. said piston member is actuated by a single lever; and
p. said at least one member encircling said piston member has an encircling axis perpendicular to an axis of said groove in said wall.

19. The multi-functional valve of claim 18 wherein:
a. said piston member includes an angled aperture to direct water from said first headtube end into said base unit inlet and thence into said cylinder;
b. said angled aperture communicates with said first headtube end and said base unit inlet with said piston member in said filtered position;
c. said piston member includes a bypass aperture to direct water from said first headtube end to said second headtube end;
d. said bypass aperture communicates with said first headtube end and said second headtube end with said piston member in said bypass position;
e. said closed position has an axis of bypass aperture perpendicular to an axis of said first headtube end; and
f. said closed position has said angled aperture oppositely disposed from said first headtube end.

20. The multi-functional valve of claim 19 wherein:
a. said piston member is of a generally cylindrical shape;
b. said piston member has a base fitting into said piston aperture;
c. said base includes a concave central portion;
d. said piston member includes a handle top oppositely disposed from said concave central portion;
e. said handle top includes a first end portion of a lever;
f. said lever is operably secured to said piston member;
g. said piston member is sealably rotatable about its central axis in said housing;
h. said concave central portion communicates with said angled aperture;
i. said bypass aperture is removably alignable with said headtube;
j. said head portion includes a piston aperture;
k. said piston aperture terminates at said base portion;
l. said interior portion and said stepped portion are cylindrical in shape;
m. said interior portion has a larger diameter than said stepped portion;
n. said lever is secured to a top of said stepped portion;
o. a flattened ring fits around said stepped portion; and
p. said flattened ring is secured to said head portion thereby vertically securing said interior in said piston aperture.

* * * * *